United States Patent Office 3,520,527
Patented July 14, 1970

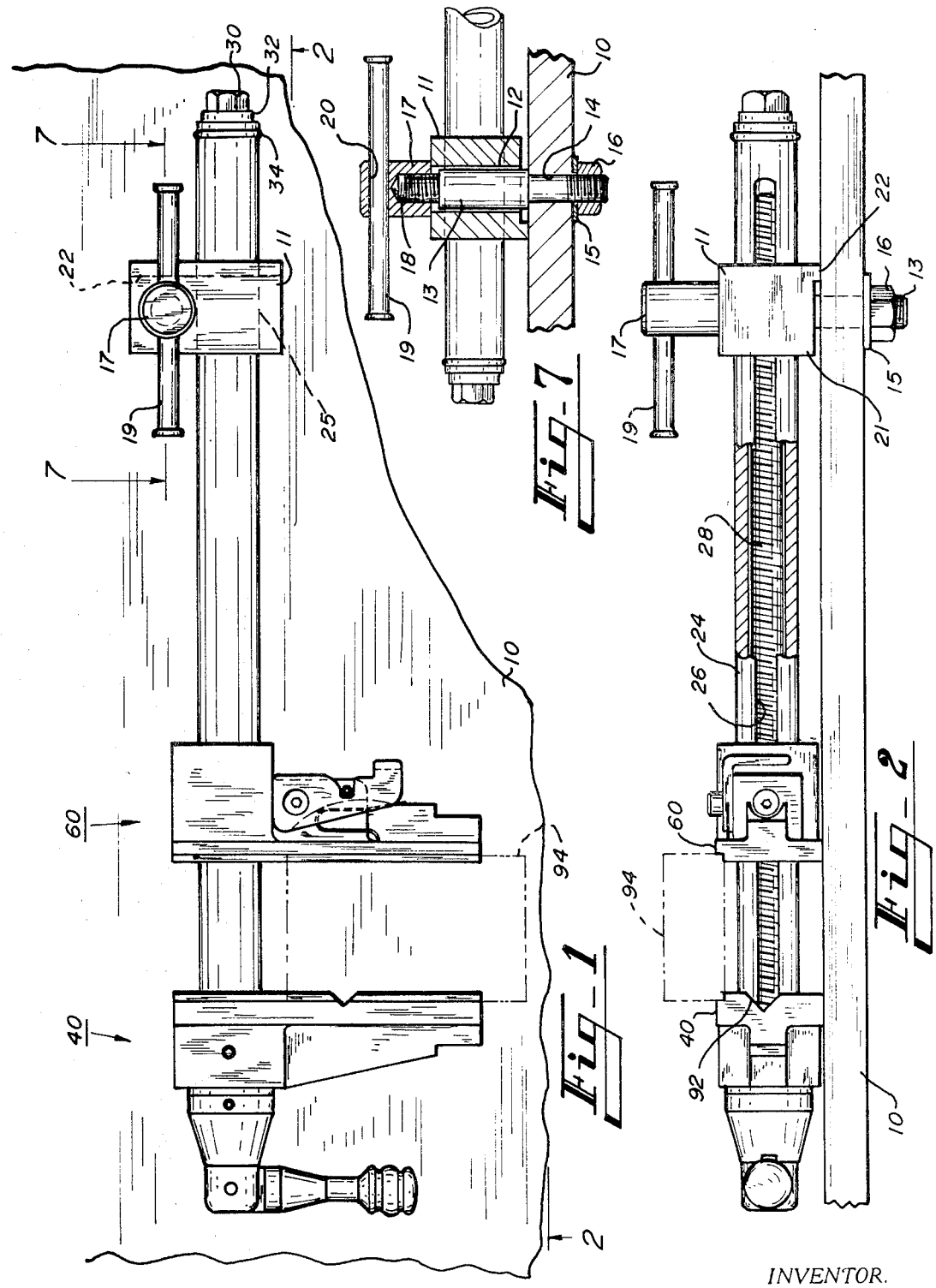

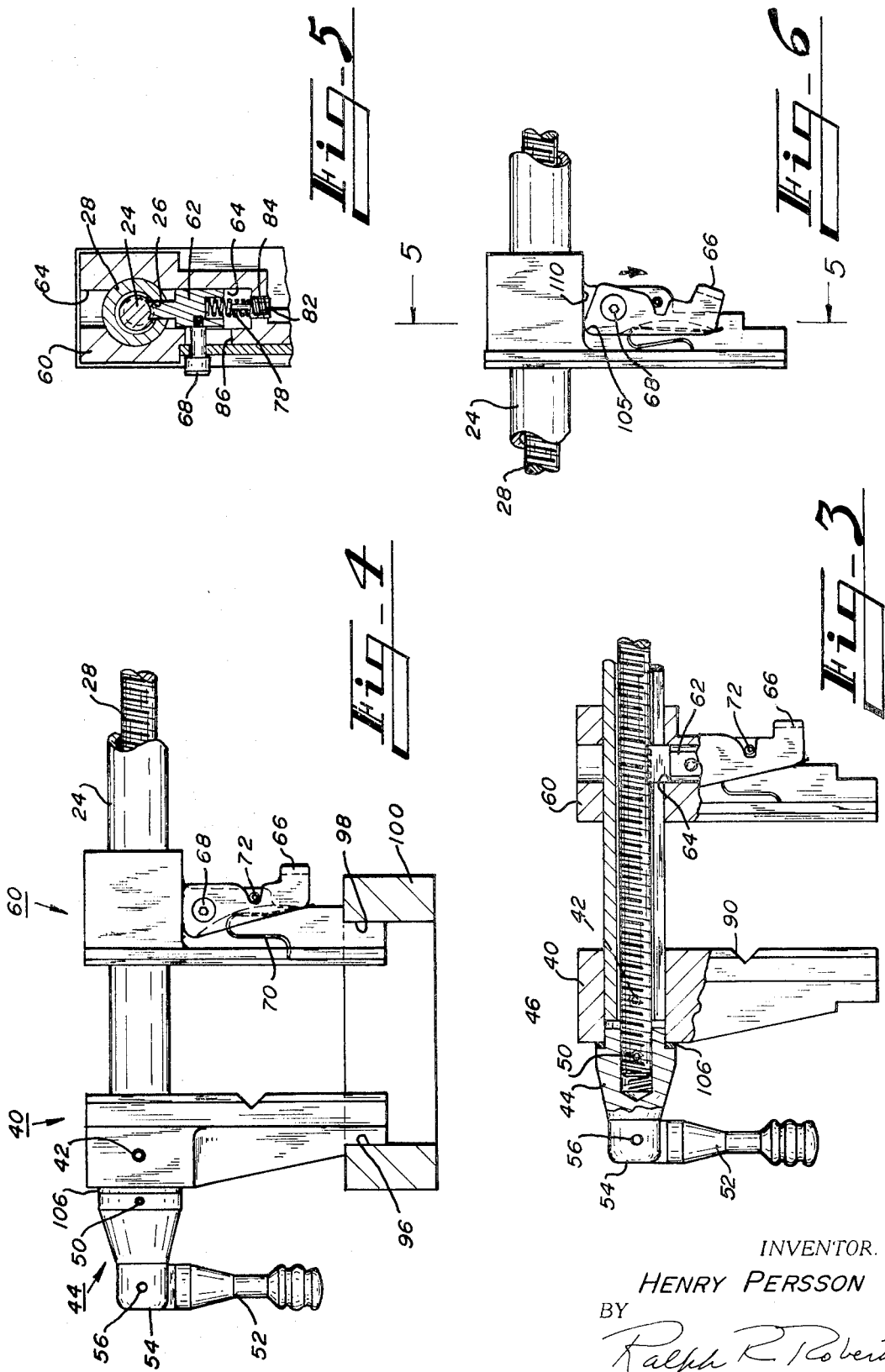

3,520,527
QUICK-CHANGE VISE
Henry Persson, 224 Glenwood Ave.,
Bloomfield, N.J. 07003
Filed July 30, 1969, Ser. No. 846,146
Int. Cl. B25b 1/12, 1/22
U.S. Cl. 269—73                    4 Claims

ABSTRACT OF THE DISCLOSURE

A quick-change vise is provided with a pair of jaws which are adapted to rest on a machine tool table. The vise has a tubular member upon which one of the jaws is moved for adjustment and clamping of a workpiece. A clamp block holds the vise on the table and is adapted to permit a sliding adjustment of the tubular member. The vise may be clamped to the table by bowing the tubular member to lock the vise to the table. This quick-change vise is somewhat similar to my vise shown in U.S. Pat. 2,724,295, issued Nov. 22, 1955, however in the present vise there is a simplified shaft clamp for the tuular member. Quick-change adjustment of the movable jaw is by a lead screw engaged by a lever-operated lead screw engaging half-nut. A safety stop is provided to prevent accidental disengagement of the half-nut from the lead screw when clamping pressure is applied to the movable jaw.

FIELD OF THE INVENTION

This invention pertains to work holders or supports wherein, as a vise, one jaw is fixed to a rod or tube and the other jaw is slidable and releasably clampable on the same rod or tube.

BACKGROUND OF THE INVENTION

In quick-setting vises for use as work holders on drill presses and the like, it is a great assistance and advantage for the vise to be positioned and clamped to a work table so that successive and like pieces may be clamped in the vise for performing similar or like operations on these pieces. In particular on drill presses or boring machines where a hole is to be drilled, tapped and/or counterbored the precise positioning of the piece is often of paramount importance. Time to clamp the piece is also important. Quick-setting vises such as shown in my U.S. Pat. No. Re. 23,519, issued July 1, 1952, and U.S. Pat. No. 2,724,295, issued Nov. 22, 1955, provided such a type of work holder, however this invention pertains to improvements in vises of this type. These improvements include a simplified clamp block for releasably clamping the vise to the work table. Other improvements include a lever actuated half-nut engaging means carried by the movable jaw as well as having the outer ends of the vise jaws contoured and shouldered so as to engage and support the inner surface of a tubular work piece whereby to precisely retain the piece on the vise.

BRIEF DESCRIPTION OF THE INVENTION

A quick-change vise similar to the vise shown in my U.S. Pat. No. Re. 23,519 has a clamp member in the form of a solid block having a transverse hole sized to slidably retain a tubular spindle member of the vise. The underside of this block has a relief formed at its forward portion and an extending rib formed on its rear portion. A clamp bolt passes through the block and a clamp nut on the bolt is turned to draw the block to the table of the machine tool. As the extending rib of the block is pressed against the table, the block tilts to bend the tubualr spindle member of the vise. A lead screw extends through the length of the tubular spindle and at one end is connected to a handle for rotation of the screw. An access slot is provided in the tubular housing of the spindle and slidably retained in this slot is a lever-actuated half-nut carried in the movable jaw member of the vise, said half-nut being movable into and out of engagement with the screw. This movable jaw is slidable on the tubular spindle and carries a toggle lever having a cam portion disposed so as to lift the half-nut from engagement with the screw when the lever is actuated. A safety stop engages the lever to prevent an accidental dislodgement of the half-nut from the screw as the jaw is tightened on the work piece. The jaws are contoured at their ends so as to provide means for engaging and retaining a tubular member on its inner diameter.

There has been chosen a preferred embodiment of a quick-change vise for the purpose of illustration and description as shown in the accompanying drawings wherein:

BRIEF DESCRIPTION OF THE DRAWINGS

FIG. 1 represents a plan view of the vise of this inventiton and showing the preferred arrangement of the details of the vise as it lies upon a work table;

FIG. 2 represents a side view of the vise, partly in section and with the view taken substantially on the line 2—2 of FIG. 1 and looking in the direction of the arrows;

FIG. 3 represents a fragmentary plan view in a slightly enlarged scale and showing in section the construction of the jaw portion of the vise of FIG. 1;

FIG. 4 represents a plan view showing outside appearance of the construction of the vise jaws of FIG. 3 with its jaw portions holding a tubular work piece;

FIG. 5 represents a transverse sectional view showing the internal construction of the half-nut latching mechanism, the view taken on line 5—5 of FIG. 6;

FIG. 6 represents a side view of the movable jaw portion of the vise as seen in FIG. 4 but with the operating lever moved to cause the half-nut to be moved from engagement with the lead screw, and FIG. 7 represents a sectional view showing the assembled arrangement of the clamp-nut, clamp bolt, work table, and clamp block.

In the following description and in the claims, various details will be identified by specific names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention.

DESCRIPTION OF THE PREFERRED EMBODIMENT

Referring now to a quick-change vise as shown in FIGS. 1 through 7 and particularly as shown in FIGS. 1, 2, and 7, it is to be noted that this vise is adapted to rest upon a worktable 10 of a drill press and the like, not shown. This vise is maintained on the table by means of a clamp block 11 which has a through bore 12 which loosely retains clamp bolt 13. This clamp bolt has both ends reduced in diameter and these ends are threaded. The larger body portion of bolt 13, as reduced to practice, is three-quarters of an inch in diameter and bore 12 is seven-eighths of an inch in diameter. The smaller lower end of the bolt 13 is mounted in and extends through a hole 14 formed or provided in the table 10. A washer 15 and nut 16 is mounted on the lower threaded end of the bolt 13 and the nut is tightened to fixedly mount the bolt to the table. A clamp-nut 17 has a threaded hole 18 formed therein; this threaded hole mates with and is mounted on the threaded upper end of bolt 13. A finger bar 19 is slidable in a transverse hole 20 formed in the nut 17 and is grasped to rotate the nut to move block 11 towards and to the table. On the underside of the block 11 there is formed a relief 21 which terminates at a downwardly extending ribbed portion 22 which extends across one end of the bottom of the block.

A shaft member 24 is slidable within a hole 25 in the block 11 and in actuality the member 24 is a piece of tubing. A longitudinal slot 26 is formed in a substantial portion of the tube and provides an access to the thread portion of a screw 28 which extends through the inside of the tube member 24 and is freely rotatable therein. The screw has one end threaded for a nut 30 which engages a washer 32, and by which the screw is retained on one end within the tube 24. Also provided at the right end of the tube 24 is a snap ring 34 which acts as a stop collar so as to prevent the unwanted withdrawal of the tube 24 rightwardly from the clamp block 11. As particularly seen in FIG. 3, the tubular shaft 24 carries on its left end a fixed block or jaw 40 which is attached to the tube 24 by means of one or more dowels or pins 42. To the left of this jaw is a nut member 44 which is rotatably shouldered in jaw 40. After the nut 44 has been tightened onto the screw portion 28, the nut is locked on the left end of screw 28 by means of a roll-pin or dowel 50. The extreme outer or left end of the nut 44 is slotted to provide parallel retaining shoulders between which is mounted a swing handle 52 which is pivotally retained in this slot passageway 54 by means of a pin 56.

Slidable upon the exterior of the tube member 24 is a movable jaw 60 which jaw carries within it a half-nut member 62. This half-nut member is reciprocably slidable within a bored hole portion 64 and is moved back and forth therein by means of a manipulating lever 66. The lever is connected to the half-nut by means of a cap screw 68 which is mounted in a threaded hole in the half-nut 62. A leaf spring 70 is mounted on the jaw with one end disposed so as to urge and engage the lever 66 counterclockwise as seen in FIGS. 3, 4, and 6 and around the capscrew 68. The extent of this direction of movement of the lever is restrained or limited by a pin 72 which is carried or mounted in a tongue portion of the movable jaw 60.

Referring next to FIG. 5 it is to be noted that the member 62 at its threaded or inner end is flattened so as to enter and slide within the groove 26. The threaded end portion of the half-nut is urged into engagement with the screw 24 by means of a spring 78 which has one end carried in a socket 80 formed in the half-nut member 62. The other end of the compression spring 78 is retained and urged into determined compression by means of a set screw 82 carried in a threaded hole 84 in the jaw 60. Screw 68 is moved in and out by the movement of lever 66 which results in screw 68 sliding back and forth in a slot 86 formed in the side of jaw 60.

It is to be noted that the jaw 40 has its face adapted to engage and retain either round or rectangular pieces by means of notches 90 and 92 formed in the face of this fixed jaw 40. Shouldered recesses are formed in the upper faces of the jaws 40 and 60 so as to provide a gripping means and seat for a work piece 94 as seen in FIGS. 1 and 2. The work piece 94, as seen, is shown in phantom outline. The jaws 40 and 60 at their exterior and outer ends are also shouldered and contoured at 96 and 98 so as to provide fingers adapted to engage the internal diameter of a tubular member 100 and retain this tubular member on the shoulder portions 96 and 98 of the jaws.

USE AND OPERATION OF THE QUICK-CHANGE VISE

The vise jaw members 40 and 60 of this quick-change vise are adapted to be mounted upon the table 10 with the jaws laying on one of either of their sides on the table, as seen in FIGS. 1 and 2, or with the jaws standing up with their back ends resting upon the table. In either position, the nut 17 is tightened to cause the block 11 to be urged towards the table top whereupon the rib 22 causes the block to tilt slightly, causing the shaft or tube 24 to be angled toward the table until it is bent or bowed slightly, thus urging the jaw 40 into a tight engagement with the top of the table 10. Prior to the tightening of the clamp-nut 17, a workpiece is clamped in the vise and the workpiece is positioned on the table at the desired work-performing position whereupon the clamp-nut is tightened to cause at least the fixed jaw to be clamped in position on the table top. After clamping in position, each successive workpiece to be retained is placed between the jaws 40 and 60. With the work grossly placed, the jaw 60 is released for sliding into position by the disengaging of the half-nut from the screw 28. This is accomplished by grasping lever 66 to cam the nut member 62 outwardly from the screw 24. In gripping the lever end, the lever is moved clockwise to the position shown in FIG. 6. The flat end surface 104 of the lever 66 is of a length to act as a cam which causes the cap screw 68 to be moved outwardly as indicated by the arrow in FIG. 6, and as it moves the member 62 is moved from engagement with the thread portion of the screw 24. In this condition, the movable clamp 60 is free to slide back and forth along the tube 24. When the jaw 60 has been brought into or near an engagement with the workpiece to be held, the lever 66 is released whereupon spring 70 urges the lever in a counterclockwise direction so that the screw thread end portion of the half-nut 62 is urged toward and is brought into engagement with the threads of the screw 28. If the thread of the nut and screw are not in mesh, a partial turn of the lever 52 causes the screw 28 to rotate until the threaded portion of the nut 62 mates with and moves into engagement with the screw 28.

The movable jaw 60 is movable in either direction as determined by the rotation of the screw 28 as provided by rotation and manipulation of lever 52. With the controlled movement of the screw, the jaw 60 may be caused to grip the work between the jaws 40 and 60 to retain the work therebetween or jaw 60 may be caused to move away from jaw 40 to grip the inner surface of a tubular member as is shown in FIG. 4. As the thread of the screw 28 is preferably an acme-type thread, a side thrust on the nut may tend to cause the nut to be cammed outwardly on the slope of the thread form. Spring 70 is strong enough to overcome this thrust in one direction and the stop pin 72 prevents any camming action by the half-nut 62 from urging the lever arm 66 further in a counterclockwise direction. Therefore, the stop 72 and spring 70 insure that the action of the lever 66 is restricted only to a determined manual action of moving the lever 66 from the condition of and position of FIG. 4 to the position and condition of FIG. 6.

It is to be further seen in FIG. 3 that, as the screw 28 draws the movable jaw 60 towards the fixed jaw 40, this thrust is taken by an antifriction thrust collar or washer which preferably is a bronze washer 106. This thrust washer is disposed between the shoulder of the nut 44 and the left face of the fixed jaw 40.

The clamp block 12 provides a simple yet highly effective means for urging the fixed jaw into clamp condition on the table top. Wear of the block is quite minimal and when and as it occurs is not a factor until the hole 25 becomes quite enlarged whereupon a simple repair sleeve is pressed into a rebored hole in the block so that the block is substantially as effective as when new and unused. Of course, instead of the relief 21 and rib 22 as shown on the bottom of the block 11, this bottom surface could be formed at a slope or angle but such an arrangement requires that chips, dirt and the like often and usually found in drilling and like work operations must be kept from accumulating under the block.

In the preferred embodiment there is provided one-eighth of an inch clearance on the diameter of the body of the bolt 13 and bore 12 is clamp block 11. This clearance permits the loosened block to be freely tilted so that the jaws of the vise can be turned from the side to their back face or to the other side. In addition this clamp may be used to hold sheet metal to the table top. To accomplish this, the sheet metal is placed in position on the table, then the vise with jaws separated at the desired distance, is placed on the sheet metal with the jaws spaced so that the operation to be performed can be performed, after which the clamp-nut 17 is tightened to move the jaws 40 and 60 toward the table 10 and into clamping condition to hold the sheet metal against the table top.

It is also to be noted that the actuation of the spring-urged lever 66 requires only a simple gripping action to cause the camming action of end 104 to become effective. As the lobe end 105 engages and slides on face portion 110 of the jaw 60, the shank of cap screw 68 slides in the slot 86 in this jaw. This slot may be used as an orienting means for the half-nut or preferably the flattened end of the half-nut 62, as it slides in slot 26 in tube 24 orients the nut and insures that the threaded end of the half-nut is always positively aligned with the thread of the lead screw 28. Either nut 44 on the drive end of screw 28 or nut 30 on the distal end of the screw takes the thrust load on the screw as the movable jaw is moved into work-gripping condition. When the lever 66 is released to permit the nut 62 to move to and into the screw 28, it often occurs that the thread portions do not mesh with each other so that the facing crest surfaces of the thread forms are in contiguous engagement. The lever 66, of course, is in the condition of FIG. 6 or substantially so, whereupon the operator by merely pushing or pulling the movable jaw along the tubular member 24 soon moves the half-nut 62 to a position for the meshing of the threads. The springs 70 and 78 then urge the nut 62 into engagement with screw 28 whereupon the cap screw 68 moves toward tube member 24. This movement results in a counterclockwise rotational movement of lever 66 around cap screw 68 and, in practice, this movement is usually quite rapid. The safety limit and stop provided by pin 72 insures that this rotation of lever 66 is strictly within the determined and desired limits. The end surface 104 of the lever 66 as it abuts and engages surface 110 of the jaw provides a determined inward engagement of the half-nut thread with the thread of the screw 28.

The outer shouldered portions 96 and 98 formed on the jaws 40 and 60 are contoured so as to provide like and equal stop shoulders and engaging surfaces on the inner diameters of tubular workpieces. When the jaws 40 and 60 are thus used, it is contemplated that the ends of the jaws will rest on the top of the worktable. Of course, where it is required to perform operations on the side of the tubular workpiece, the jaws 40 and 60 may be laid on their sides on the table top with the ends overhanging the edge of the table and the table is swung to the side of the machine tool spindle.

The swivel action of the swing handle 52 permits the vise to be clamped to a table top 10 and the screw rotated by half-turns. As this is a slightly inconvenient and time-consuming operation, it is very desirable to grossly slide the jaw 60 to its near final position and then with only one or two half-turns of the swing handle to complete the clamping action of the movable jaw.

It is to be noted that the vise may be used as a floating vise in that the workpiece is clamped in the vise and, with tightening nut 17 loosened so that block 11 is free to rotate around bolt 13. In its loosened condition tube 24 is free to slide in block 11 so that the workpiece may be freely moved on the top of table 10 while being firmly retained from turning in the jaws of the vise.

Terms such as "left," "right," "up," "bottom," "top," "front," "back," "in," "out," "clockwise," "counterclockwise" and the like are applicable to the embodiment shown and described in conjunction with the drawings. These terms are merely for the purposes of description and do not necessarily apply to the position in which the quick-change vise may be constructed or used.

The conception of the quick-change vise and its many applications is not limited to the specific embodiment shown but departures therefrom may be made without sacrificing its chief advantages and protection is sought to the broadest extent the prior art allows.

What is claimed is:

1. A quick-change vise for use on the flat surface of a worktable, said vise having a pair of jaws with opposed parallel gripping faces adapted to grip a workpiece and the like, one of said pair of jaws being fixed to a slotted tubular member and the other jaw slidable on the tubular member and towards and from the fixed jaw, the tubular member further having a lead screw rotatably retained therein, the movable jaw in combination with the tubular member and screw including: (a) a half-nut member slidably carried by and in a guideway provided in the movable jaw, the half-nut having threads formed in and on its inwardly extending end, the threads disposed to mate with the threads of the lead screw, said inner threaded end being contoured to enter and slide in the slot in the tubular member so as to be maintained in an oriented and aligned condition in the slot so that the threads of the nut may be moved into engagement with and mate with the threads of the screw; said half-nut as it is carried in the slot in the tubular member maintaining the slidable jaw in a determined orientation with said slot; (b) a spring carried in the guideway and disposed to urge the half-nut towards and into engagement with the threads of the screw; (c) a lever, pivotally carried by and on the half-nut member, said lever having a cam portion provided thereon, the cam disposed at one limit of action to engage a shoulder provided on the movable jaw so as to limit the inward movement of the half-nut member toward and to the threaded screw and during its movement to the other limit of travel, the lever causes the cam to engage the shoulder on the jaw to move the half-nut to a disengaged condition with the lead screw while maintaining sliding engagement with the slot in the tubular member; (d) a positive stop carried by the movable jaw and disposed to limit the pivotal movement of the lever to a cam actuated disengaged condition of the half-nut and the lead screw at said positive stop and another positive stop adapted to limit the pivotal movement of the lever to permit the half-nut to be urged to the determined engaged condition of the half-nut and screw, and (e) means engaging the tubular member for retaining the vise in a selected condition and position on the worktable, said means including in one condition the clamping of the tubular member against unwanted movement and in another condition permitting a swinging movement of the tubular member around a determined pivot point on the worktable.

2. A quick-change vise as in claim 1 in which the jaws have their outer ends contoured to provide parallel outer surfaces formed on each jaw and on the side opposite the opposed gripping face on the jaw, each of said outer surfaces terminating at stop shoulders disposed at a determined distance from the ends of the jaw and disposed to lie in a common plane, said contoured ends adapted to engage the inner surface of and retain a tubular workpiece when the jaws are inserted into the tubular workpiece and then are moved apart to provide a determined outward thrust against the walls of the workpiece.

3. A quick-change vise as in claim 1 in which the jaws have their outer ends contoured to provide on each jaw an arcuate surface convex in form, each of said arcuate surface formed on a side opposite the opposed gripping face on the jaw, each of said outer surfaces terminating at stop shoulders disposed at a determined distance from the ends of the jaws and disposed to lie in a common plane parallel to the axis of the tubular member, said contoured ends adapted to engage the inner surface of and retain a tubular workpiece when the jaws are inserted into the tubular workpiece and then are moved apart to provide a determined outward thrust against the walls of the workpiece.

4. A quick-change vise for use on the flat surface of a worktable, said vise having a pair of jaws, one of which is fixed to a slotted tubular member and the other which is slidable on said tubular member and towards and from the fixed jaw, the tubular member further having a lead screw rotatably retained therein, the movable jaw in combination with the tubular member and screw including: a half-nut carried by the movable jaw and having threads formed in and on the inwardly extending end, said threads disposed to mate with the threads of the lead screw, the inward end of the nut being further contoured so as to enter and slide in the slot of the tubular member for the maintaining therein of the nut in an oriented and aligned condition for the mating of the threads; means for maintaining the nut in a determined engagement with the screw so that said movable jaw is positioned by and moved by the rotation of the screw in the tubular member, and a clamp block of unitary construction and having a passageway of fixed diameter therethrough for the slidable passage of the tubular member, this passageway having its axis disposed at a parallel condition with a major bottom surface of the block and a rib portion adjacent to and extending downwardly from the major bottom surface and with the extent of rib disposed transverse of the axis of the tubular retaining passageway, which major surface is disposed to rest upon the top of the worktable, said block having a transverse hole formed therein which hole is substantially normal to the axis of the fixed diameter passageway, the transverse hole disposed to loosely engage and retain a table mounting bolt.

References Cited

UNITED STATES PATENTS

| Re. 23,519 | 7/1952 | Persson | 77—63 |
| 760,411 | 5/1904 | Arnold | 269—270 XR |
| 1,716,887 | 6/1929 | Griesell | 269—173 |
| 3,020,058 | 2/1962 | Feldman | 279—123 |

FOREIGN PATENTS 5,114   1885   Great Britain.

ROBERT C. RIORDON, Primary Examiner

D. D. EVENSON, Assistant Examiner

U.S. Cl. X.R.

269—182